United States Patent [19]

Jones

[11] Patent Number: 4,965,571
[45] Date of Patent: Oct. 23, 1990

[54] GARAGE PARKING GUIDE

[76] Inventor: John W. Jones, 25 Fairbanks La., Basking Ridge, N.J. 07920

[21] Appl. No.: 360,114

[22] Filed: Jun. 1, 1989

[51] Int. Cl.$^5$ .............................................. B60Q 11/00
[52] U.S. Cl. ............................ 340/932.2; 116/28 R; 116/202
[58] Field of Search .......................... 340/932.2, 687; 116/28 R, 28 A, 202; 200/61.41, 61.79, 332, 335, 337; 362/802; 33/264

[56] References Cited

U.S. PATENT DOCUMENTS

| | | | |
|---|---|---|---|
| 2,454,896 | 11/1948 | Traub | 340/932.2 |
| 3,121,416 | 2/1964 | Gizdich | 116/28 R |
| 3,219,972 | 11/1965 | Williams | 116/28 R |
| 3,261,321 | 7/1966 | Mandl | 116/28 R |
| 3,493,925 | 2/1970 | Brancale | 116/28 R |
| 3,621,807 | 11/1971 | Chuwan Kang | 116/28 R |
| 3,820,065 | 6/1974 | Koplewicz et al. | 340/932.2 |
| 4,036,165 | 7/1977 | Wood | 116/28 R |
| 4,101,868 | 7/1978 | Bubnich et al. | 340/932.2 |
| 4,127,856 | 11/1978 | Bickel | 340/687 |
| 4,145,681 | 3/1979 | Bubnich et al. | 340/932.2 |
| 4,288,777 | 9/1981 | Luik | 340/932.2 |
| 4,813,758 | 3/1989 | Sanders | 350/97 |

FOREIGN PATENT DOCUMENTS

| | | | |
|---|---|---|---|
| 2023258 | 12/1971 | Fed. Rep. of Germany | 200/61.41 |
| 917249 | 12/1946 | France | 200/335 |
| 2102608 | 2/1983 | United Kingdom | 116/28 R |

Primary Examiner—William A. Cuchlinski, Jr.
Assistant Examiner—W. Morris Worth
Attorney, Agent, or Firm—William T. Hough

[57] ABSTRACT

In a preferred embodiment, a motor vehicle driver-indicator guide-device for signifying when it is safe to advance, including support structure mounting a light signaling structure and mechanism therefor, that displays a signal light viewable by a driver of a motor vehicle, with an actuating lever actuatable by an advancing motor vehicles's bumper, with a green light of the light signaling structure having an electrical circuitry and an electrical switch that is normally closed providing a go signal evidencing that further advancement of the motor vehicle may be continued, actuation of the actuating lever serving to open the normally closed electrical switch when the actuation switch is pressed beyond a predetermined position indicative of maximum allowable forward advancement permissible for the advancing motor vehicle, the support structure having a tape mounted thereon carrying an adhesive backing for mounting the mounting structure on an upright surface of a wall or the like, the green light carrying a symbol viewable when the switch is closed indicative of permissive further advancement.

8 Claims, 6 Drawing Sheets

GARAGE PARKING GUIDE

This invention is directed to a motor vehicle driver-indicator guide-device for indicating when advancement of a motor vehicle is permissible when parking in a garage or other parking space.

PRIOR ART

As a result of a novelty/patentability search conducted in U.S. class 116, subclasses 4, 28 and 29 and class 340, subclass 61, no relevant prior art was discovered. Patents found include the following patents. Brancale U.S. Pat. No. 3,493,925 granted Feb. 3, 1970 discloses a light becomes electrically energized when activating switch is pressed by a bumper of an advancing motor vehicle. There is no signal given prior to activation of that light. Bubnich et al. U.S. Pat. No. 4,101,868 granted Jul. 18, 1978 discloses a mechanical device which likewise reveals a signal solely when the actuating lever is pressed rearwardly by a motor vehicle bumper, prior thereto the signal not being discernible, together with the possibility that dust, corrosion or rodent matter that might get into such casing be a potential hazard leading to the lever not properly functioning over an extended period of time. The Mandl U.S. Pat. No. 3,261,321 granted Jul. 19, 1966 likewise is a mechanical large and complicated mechanism requiring mounting on a side wall with the display extending around the corner of typically a garage, and requiring reading of a chart and movable arrow thereon while concurrently attempting to steer and park the advancing motor vehicle. Wood U.S. Pat. No. 4,036,165 granted Jul. 19, 1977 discloses an actuating lever which when moved rearwardly by a pressing bumper, causes a bell ringer to be cocked and to subsequently ring a bell at a predetermined stopping point at which a warning sign concurrently has become turned to a pivoted face-on position fully viewable when the automobile has advanced to its maximum safe position of parking. The device that includes a large number of operative bell-ringing apparatus is subject to become malfunctional together with the exact position of the pivoting sign requiring judgement and interpretation on the part of the driver, and the apparatus is large and bulky and complicated. Williams U.S. Pat. No. 3,219,972 granted Nov. 23, 1965 discloses an actuation lever which upon movement rearwardly by pressure of a bumper of an advancing automobile, eventually causes a light to become actuated, and eventually to be turned-off after passing several phases of pivoting of a structure carrying different colored transparent material indicative of differing positions of the advancing motor vehicle. This patent like the above-noted Mandl patent requires the light to be first turned-on by the advancing bumper against the actuating lever, followed by required careful observance and interpretation of the changing light emitted through the consecutively different colors of light passing through the transparent material on the pivoting structure, requiring constant observation, attention and interpretation thereof.

BACKGROUND TO THE INVENTION

Prior to the present invention, as typically evidence by the above-noted non-teaching prior art, prior art parking guide apparatuses consistently require pressure of a bumper or the like, against the actuation lever to turn-on or to initiate operation of the respective devices. In the event of malfunctioning of the device for any of numerous possible causes, including the possibility of run-down batteries and/or electric house-current having gone-off (terminated) unknowingly to the driver of the approaching parking automobile, the driver will drive the automobile (or other motor vehicle) forwardly against the actuating lever potentially eventually pressing against and destructively pushing-out the garage wall that the parking indicator device had been relied on to protect against accidental damage. Unreliable non-foolproof devices giving a false sense of security are worse than having no parking indicator device at all. Likewise, non-electrical devices as evidenced by the typical prior art, all rely upon complicated gearing and mechanisms of operation, which if accidentally non-functional serve to leave the driver of the approaching parking with a false sense of securing and reliance thereon, with a resulting increased likelihood of the automobile crashing into and pushing-out or otherwise destroying the garage front-end wall. Also, as evidenced typically by the foregoing patents, the complicated and involved mechanism of operation and numerous parts thereof drive-up the cost of production and sales price thereof. As well, the more complicated, the greater the likelihood of malfunctioning eventually. Also, it is highly undesirable to have ugly monstrocities mounted in the garage, as well as space within a garage normally being at a minimum and large apparatuses being undesirable. Most importantly, the prior art devices have failed totally to provide a fail-safe mechanism and mode of operation that reasonably can be expected to avoid the driver having a false reliance thereon.

THE OBJECTS

Accordingly, the objects of this invention include overcoming and/or avoiding problems and difficulties of the types typically represented above.

Another object more particularly is to obtain a garage parking indicator device which provides a reliable indication of being currently operative and correct in its indicated signal.

Another object is to obtain a parking indicator device which provides an unmistakeable and easily discernible indication of permissive advancement by a parking motor vehicle such as an automobile, to a driver of the parking automobile, so long as permissive advancement is safe.

Another object is to obtain a parking indicator device which unmistakeably immediately is discernibly not approving further advancement as easily ascertained by the driver of an advancing parking motor vehicle such as an automobile.

Another object is to obtain a parking indicator device which is easily ascertainable to be in an operative "on state" condition indicative of permissible advancement up to a predetermined point of advancement beyond which advancement is not safe for an advancing motor vehicle to be parked.

Another object is to obtain a parking indicator device having a mechanism of maximum simplicity and minimum possible parts sufficient to reduce or eliminate possibilities of imparting a false or unreliable advance to a driver of an advancing motor vehicle to be parked as viewed by the driver of the motor vehicle.

Another object is to obtain a parking indicator device of simple principle of reliable operation such that probability of eventual inoperativeness is reduced or eliminated.

Another object is to obtain a parking indicator device of sufficiently simple operation and few parts and low cost of assembling as to obtain a desirable low sales price sufficiently to make such device more readily affordable and desirable to the consuming public.

Another object is to obtain a parking indicator device of light weights, much lighter and less bulky and complicated, as contrasted to prior art devices, as to make the mounting thereof easy and practical at a plurality of potential diverse locations within a garage.

Another object is to obtain a parking indicator device that includes alternative mounting capabilities for easy mounting thereof.

Another object is to obtain a parking indicator device of improved more compact size as contrasted to prior art devices, to provide for easy mounting thereof at diverse locations within a garage.

Another object is to obtain a parking indicator device that includes structure making it utilizable at any of varying height(s) in a garage in front of a potentially advancing motor vehicle during the parking thereof.

Another object is to obtain a parking indicator that is of low operating cost during and/or after installation thereof in typically a garage.

Another object is to obtain a simple and inexpensive parking indicator device that reliably provides a driver of a motor vehicle such as an automobile, with a reliable easily discernible indication of when the back of the vehicle has cleared the position at which the garage door will close.

Another object is to obtain a simple parking indicator device in so far as the setting-up and operation thereof, requiring minimal expertise or knowhow, such that everyday people can mount and operate the device without difficulty or problems.

Another object is to provide a parking indicator device that concurrently serves as a steering guide for a driver in an advancing motor vehicle during the garage parking thereof.

Other objects become apparent from the preceding and following disclosure.

Preceding objects are obtained by the invention as described herein.

BROAD DESCRIPTION OF THE INVENTION

The present invention constitutes major significant improvements over prior motor vehicle driver-indicator guide-devices for signifying when it is safe for the driver to advance the motor vehicle. The above-noted devices of the prior art include a support structure mounting a signaling structure and mechanism thereof for displaying a signal viewable by a driver of a motor vehicle to be advanced forwardly toward the signaling means, together with an actuating lever adapted to be actuated, manipulated or moved by an advancing motor vehicle.

Broadly, the improvement(s) include(s) the above-noted signaling structure and mechanism thereof positioned and existing in a first position or first state of being such that the signaling means is viewable to the driver as and indicative of existing authorization or approval for continued forwardly-advancing motion by the motor vehicle up to a contact point with the lever and thereafter to a predetermined advanced position at which the motor vehicle eventually is potentially deactivatable of the permissive advance-signal by being moved to or beyond the above-noted predetermined advanced position of beginning-inactivated state of being. Thereby an advance-authorizing signal means no longer exists or is nonviewable. As a result thereof, the driver of the motor vehicle is instantly made clearly and fully aware of the fact that further advancement of the motor vehicle should be immediately terminated. Accordingly, in its broadest major improvement, prior to contact of the motor vehicle or bumper thereof with the actuating lever of the present indicator device, by the present invention the motor vehicle driver-indicator guide-device is initially indicative of and portrays a message to the driver of the approaching motor vehicle of permission to proceed and that the device is already properly indicating the proper message to the driver. The driver may continue to rely on that continuing message exhibited, until the message suddenly disappears, thereby instantly (quickly, as opposed to gradually or slowly) removing authorization of further advancement of the motor vehicle. By the presence of the advancing signal before even reaching the point of contact of the motor vehicle with the actuating lever, the driver is given "reliable" assurance that the indicator device in operation cannot fail to become activated, as contrasted to prior art devices which fail to afford such assurance. As soon as the permission for advancing is withdrawn, the driver instantly applies the brake. It is to be understood that the above-noted predetermined point of deactivation or removal of the permission to advance further, may be set variably to allow for reaction time plus a minor degree of leniency for further advancement after the permission signal goes off, prior to the motor vehicle reaching a point at which destruction would occur to the garage or to other matters or objects stored therein.

In a preferred embodiment, the improvement further includes the above-noted signaling structure and mechanism thereof positioned and existing in a state of being at least one visually-discernible electric light, this improvement including the electrical circuitry for the light providing electrical power thereto from either a standard house-source of electrical power and/or from battery power, more preferably a house power of about 110 volts. Additionally this preferred embodiment includes mounted together with the normally-closed electrical switch and switch lever thereof operatively connected to the above-noted actuating lever to open the above-noted normally-closed switch. As a result, this further improvement provides for deactivating electrification of the above-noted visually-discernible electric light to an unlighted state whenever an advancing motor vehicle (typically the forward edge of the bumper thereof) reaches or has reached or has been moved beyond the above-noted second predetermined advanced position or said inactivated state. Accordingly, by this further improvement, a mere breaking of electrical circuit and resulting turning-off of the above-noted electric light is indicative to the driver of the motor vehicle that further advancement of the motor vehicle should be terminated. The sole requirement is thus a mere breaking of circuit when the actuating lever has been pushed to and/or beyond the above-noted predetermined point of deactivation. It is very important and significant that the breaking of a circuit is much more reliable as indicative, than requirement that electrical circuitry be completed to turn-on a light or signal. Additionally, as above noted, the fact that when approaching, even prior to the motor vehicle or bumper thereof contacting the actuating lever, the driver can visually and discernibly and unmistakenably see and be sure that the indicator device in fact is working, because of the driver seeing the lit light that signifies being operative as well as permission to advance the motor vehicle, the driver does not have to assume an unreasonable risk that the indicator device will not be operative because of lack of charged batteries and/or because the current is unexpectedly off, or because of mechanical difficulty. In the sense of mechanical difficulty, little potentially could go wrong with a simple lever that causes circuitry to be broken to terminate electric current flow when the actuating lever is advanced to and/or beyond the above-noted predetermined point of deactivation. This is in contrast to prior art complicated devices that include complicated and/or numerous interacting parts and which interaction is required to turn-on a switch or indicator. Therefore, this particular further improvement is of even greater value since an illuminated light gives reliable easily seen assurance and when turned-off or not burning (lit) initially, conveys the unmistakable message that the driver cannot under any circumstances proceed with any reliance of safety—with regard to dependence of a driver of a potentially-advancing motor vehicle, who might otherwise mistakenly depend on the indicator device that is malfunctioning or might malfunction during advancement of its actuating lever.

In a further preferred improvement, there is further included a spring structure and mechanism thereof arranged, positioned and connected between the above-noted support structure and at-least one of the above-noted switch lever and the above-noted actuating lever such that the above-noted switch lever is biased to a normally closed position whenever the actuating lever has not been physically moved to or past said second predetermined advanced position or said inactivated state.

In a further preferred improvement, the improved combination includes a lever-adjustment structure and mechanism thereof for intermittently adjusting the position or angle or orientation of the above-noted actuating lever forwardly or rearwardly relative to and substantially along an imaginary line of advancement of a motor vehicle potentially intended to contact and move or actuate the actuating lever.

In another or further preferred embodiment, the improvement further includes the above-noted actuating lever as including as a part thereof a plurality of consecutively serially interconnected elongated members which include of at-least first and second elongated members each respectively having opposite proximal and distal ends. In this preferred embodiment, the first elongated member's proximal end is pivotally mounted on said support structure, and the second elongated member is adjustably mounted on the first elongated member such that the second elongated member may be intermittently shifted alternately to and from a non-extended state to an extended state relative to the first elongated member and the support structure.

In a further preferred embodiment, the improvement further includes each of the first and second elongated members each having a longitudinal axis, the second elongated member's proximal end being pivotally hinge-mounted on the first elongated member's distal end. As a result thereof, the second elongated member is intermittently foldable alternately upwardly toward and in juxtaposition to the first elongated member, and downwardly to an extended position at which the longitudinal axis of each of the first and second elongated members are in substantial coaxial alignment with each other.

In a further preferred embodiment, the improvement further includes the second elongated member being telescopically mounted on the above-noted first elongated member such that the above-noted second elongated member is intermittently alternately extendable between an extend position and state and a retracted position and state relative to the first elongated member.

In a further preferred embodiment, at-least one or more of the preceding embodiments includes as a part of a further improvement thereof, the above-noted visually discernible electric light being green in color.

In a further preferred embodiment, at-least one or more of the preceding embodiments includes as a part of a further improvement thereof, the visually discernible electric light including symbol thereon indicating that advancement of the motor vehicle is to continue toward the actuating lever.

In a further preferred embodiment, the improvement further includes the above-noted symbol being inclusive of at-least the word "GO", to indicate to the driver of an advancing motor vehicle that advancement may continue forwardly toward the actuating lever.

In a further preferred embodiment, the improvement further includes the above-noted symbol being inclusive of an arrow.

In a further preferred embodiment, the improvement further includes the above-noted symbol being inclusive of the above-noted arrow being oriented to point upwardly.

In a further preferred embodiment, the improvement further includes for at least one of the above-noted embodiments, reflector structure and mechanism thereof mounted on at-least one of the above-noted actuating lever and/or the the support structure, and being positioned for being viewable to a driver of a motor vehicle advancing toward the actuating lever.

In a further preferred embodiment, the improvement further includes the above-noted reflector structure (and mechanism thereof) having adhesive-backed tape positioned mounted on the reflector structure such that the reflector structure may be mounted thereby against an upright surface such as on the actuating lever or on the above-noted support structure or the like.

In a further preferred embodiment, the improvement further includes reflector structure (and mechanism thereof) mounted on at-least the above-noted first elongated member, positioned for being viewable to a driver of a motor vehicle advancing toward the actuating lever, such that reflector structure potentially serves as a steering guide for advancing movement of an advancing motor vehicle; for this embodiment, more preferably the above-noted reflector structure is inclusive of adhesive-backed reflector tape adapted to mount the reflector structure on a forward face of the above-noted actuating lever.

In a preferred embodiment, the improvement further includes the above-noted signaling structure (and mechanism thereof) being pivotally mounted on said support structure and intermittently movable by the above-noted actuating lever alternately from and to a position viewable by a driver of a motor vehicle advancing toward the actuating lever. As a result of this preferred embodiment, movement of the actuating lever to or beyond said second predetermined advanced position moves said signaling means to or beyond a viewable position or state of being.

In a preferred embodiment, the improvement further includes a supplemental signaling structure and mechanism thereof, pivotally mounted on the support structure, the supplemental signaling structure (and mechanism thereof) including at least one symbol that indicates that forward motion of an advancing motor should be terminated. In this further preferred embodiment, the supplemental signaling structure (and mechanism thereof) is positioned in a normally non-viewable position and state whenever the above-noted signaling structure is in a viewable position and state. In this embodiment, also supplemental signaling structure is connected to the above-noted actuating lever such that actuation and movement of said actuating lever to or beyond said second predetermined advanced position moves the supplemental signaling means to a viewable position and state at be viewable by a driver of an advancing motor vehicle.

In a preferred embodiment, the improvement further includes the supplemental signaling means being inclusive of an octagonal shape indicative of a message to cease forward motion, as viewable.

In a preferred embodiment, the improvement further includes the supplemental signaling means being inclusive of the word "STOP" indicative of a message to cease forward motion.

In a preferred embodiment, the improvement further includes the supplemental signaling means being inclusive of an x superimposed on an arrow, indicative of a message to cease forward motion.

In a preferred embodiment, the improvement further includes the supplemental signaling means being inclusive of a red color.

In a preferred embodiment, the improvement further includes the supplemental signaling means being inclusive of a red reflector.

In a further preferred embodiment, the improvement further includes adhesive composition on a surface of the support structure positioned such that the support structure is thereby adhereable to an upright wall off a garage or a refrigerator door positioned in a garage, or the like. More preferably, the adhesive composition is a part of an adhesive-backed tape carried by the support structure.

The invention may be better understood by making reference to the following Figures.

DETAILED DESCRIPTION

With reference to the foregoing figures, in the description of the several embodiments illustrated identical indicia are utilized for identical elements of different illustrations of a common embodiment, and related indicia are utilized for the same or equivalent elements of other different embodiments. Once an element has been described for one embodiment or illustration, its identification and/or description is not repeated for other embodiments or illustrations, except in some instances for purposes of conveying clarification or improved understanding.

Figures 1, 2:
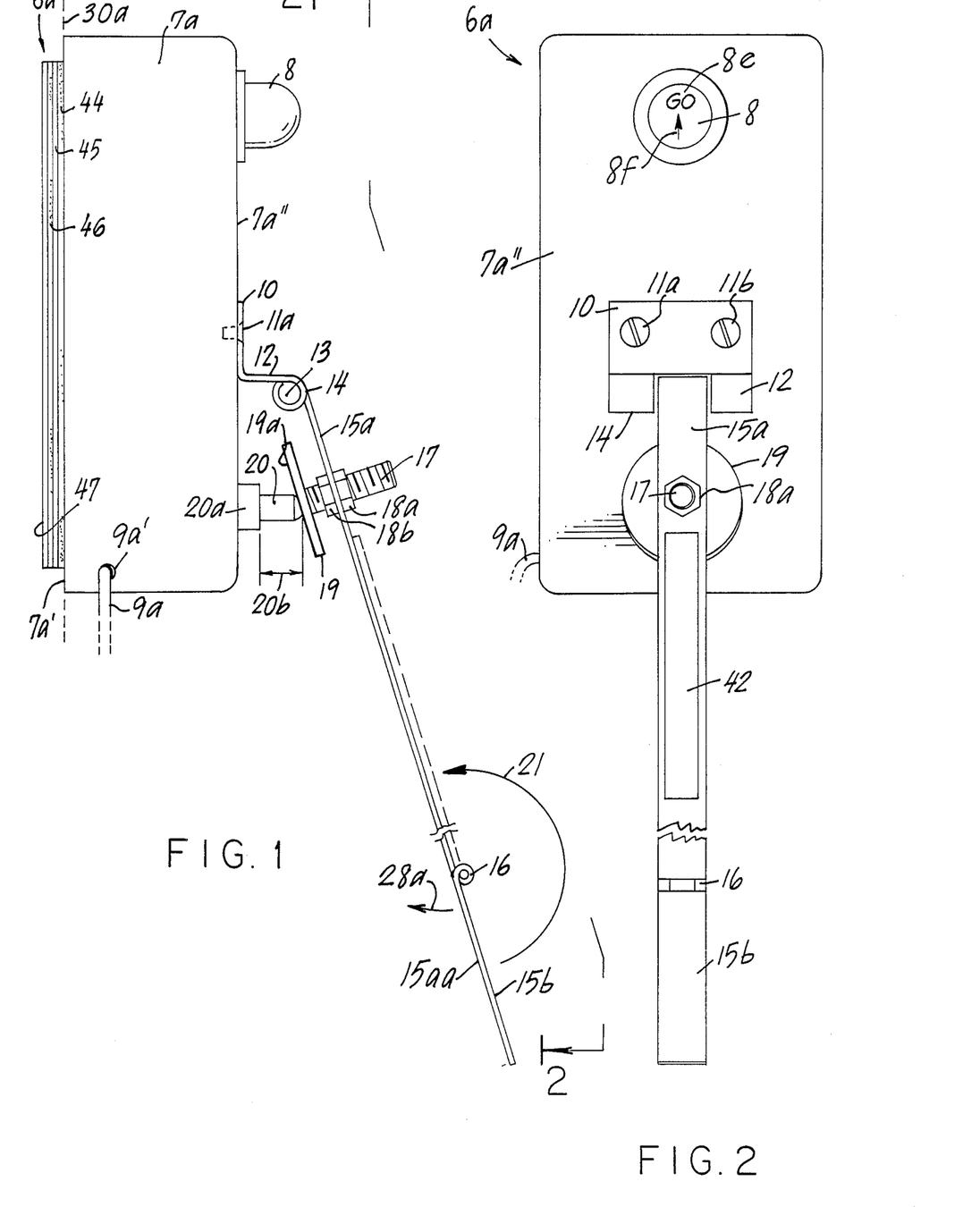
FIG. 1 diagrammatically illustrates an electrical embodiment of the present invention described-above embodying many of the described preferred features, in a side view thereof.
FIG. 2 diagrammatically illustrates the electrical embodiment of FIG. 1 as taken along the line 2—2.
Figure 3A:
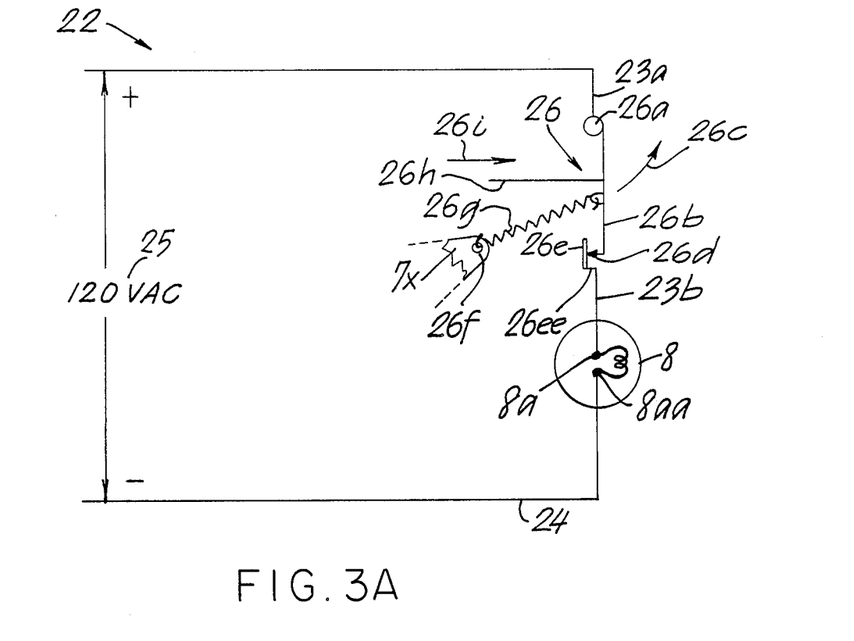
FIG. 3A diagrammatically illustrates typically the electrical circuitry and normally-closed switch of various electrical embodiments of the invention, such as that of FIGS. 1 and 2 and 4.
Figure 3B:
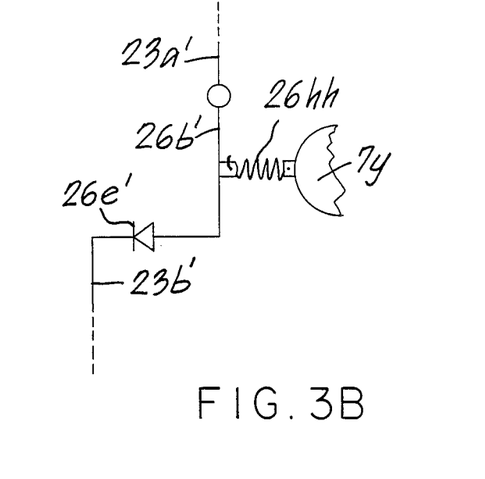
FIG. 3B diagrammatically illustrates an alternate electrical embodiment of the invention as contrasted to that illustrated in FIG. 3A, in an in-part view which otherwise is identical to the embodiment of FIG. 3A.

FIGS. 1, 2 and 3A each represent a common embodiment, and FIG. 3B represents a variation on the portion illustrated in FIG. 3A.

With reference to FIG. 1, casing support structure 7a may be mounted on an upright surface symbolically represented in phantom by line 30a by any desired mechanism after removal of the attachment laminated tape-backing 6a which is adhered to casing back-face 7a' thereof by adhesive layer 44 carrying paper (or alternatively fabric) layer 45 having another adhesive layer 46 for mounting onto an upright surface after removal of a backing (cover) strip (paper) 47. The light 8 is normally on, in the illustrated state, until the lever arm(s) 15a and 15b become pressed to move sufficiently for face 15aa to move a required (set) distance in direction 28a as to cause the adjustable button 17 with its abutment 19 to press against and press inwardly the light-deactivation button 20 within its annular support 20a sufficiently to cause electrical power circuitry of the light 8 to become broken (i.e. to open the circuit). Electrical cable 9a extending through hole 9a', diagrammatically represents an electrical power source to the electrical circuitry to the light 8. The lever 15a pivots on a pin of hinge 14 mounted by flange 12 and its mounting portion 10 onto a forward face 7a" of the casing support structure 7a, by typically a screw 11a. The extent of degree to which the lever 15a extends pivotally outwardly prior to being pressed by an oncoming bumper of an automobile, is controlled or adjustable by the female threaded nut 18b in which the shaft 17 is revolvable by female threads thereof, as the abutment face 19a of abutment 19 presses against the button 20. By hinge 16, the lever arm (extension) is foldable upwardly in direction 21.

In FIG. 2, there is viewable the printed letter GO identified as 8e, and the upwardly-directed arrow identified as 8f, which likewise are viewable when the light 8 is lit. Also two locking screws 11a and 11b are visible. The nut 18a is anchored in structure of the lever arm 15a. Lever arm 15a carries reflector 42a.

FIG. 3A symbolically illustrates a typical circuitry of the light 8 of FIG. 1. With the typical illustrated voltage differential of 120 volts alternating current (VAC) between leads 23a and 24, there is the normally closed switch including a hinge 26, switch lever 26b, switch lever closing-circuit electrical contact 26e, switch take-off lead 23b, symbolic switch actuation arm 26h that is moved in direction 26i to cause the switch lever arm 26b to move in direction 26c when lever 15b's face 15aa moves in direction 28a a predetermined required amount (distance) for the FIG. 1's abutment 19 to press against switch actuation arm 26h (or otherwise act directly or indirectly on switch actuation arm 26h). The above-noted lead 23b is connected to convey close electrical circuit with electrical contact 8a of the illustrated filament of light 8, with lead 24 being likewise connected to electrical contact 8aa. Spring 26g biases the lever arm 26b into a normally closed position, the spring being tautly connected to the hole-structure 26f of spring support structure directly or indirectly connected to the casing structure 7a.

FIG. 3B diagrammatically illustrates an alternate variation on the embodiment of FIG. 3A, in which the lever arm 26b' is "pushed" by typically coil spring 26hh into a closed state. The spring 26b' at the opposite remaining end, presses against spring-support structure 7y which is an extension of or is mounted rigidly on housing support structure.

Figures 4, 4A:
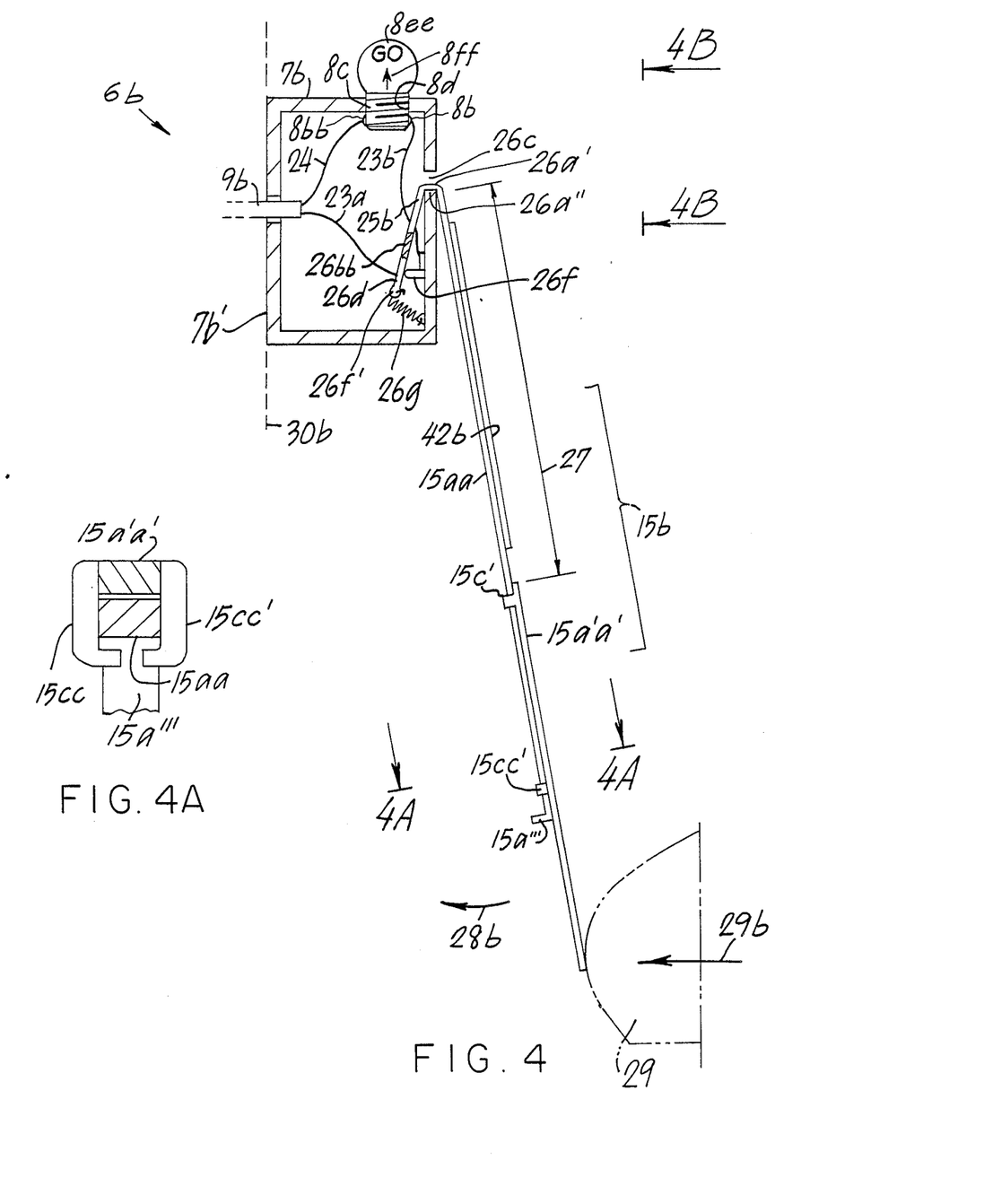
FIG. 4 diagrammatically illustrates an alternate electrical embodiment of the invention as contrasted to that of FIGS. 1 and 2, shown in a side cross-sectional view thereof.
FIG. 4A diagrammatically illustrates a cross-sectional view of the actuating lever of the electrical embodiment of FIG. 4, as taken along line 4A—4A of FIG. 4.

FIG. 4 diagrammatically illustrates an alternate electrical embodiment, in which the upper lever arm 15aa is rigidly continuous with and an extension of the u-shaped hinge-structure 26a' extending through through-opening 26c into interior space. The hinge-structure, in turn, is rigidly continuous with the electrical switch arm 25b that carries the electrical contact 26d electrically insulated from the switch arm 25b by insulation switch-arm portion 26bb. Spring 26g biases the electrical contact 26d into a normally-closed state in contact with electrical power contact 26f. Also this embodiment illustrates an alternate embodiment of extension mechanism for optionally adjusting lever length to longer or shorter dimensions, the distal lever arm 15a'a' being axially slidably mounted on proximal lever arm 15aa, an embodiment that may be utilized as an equivalent for any of the illustrated other embodiments of this invention. While either of the proximal and/or distal lever arms above-noted, may include one or more of the essential bracketing arms or flanges mounting one on the other, FIG. 4 illustrates the bracketing flanges 15c' and 15cc' extending from the distal lever arm 15a'a' to bracket the proximal lever arm 15aa, operating in conjunction with the stop or abutment structure 15a''' at the distal end of the proximal lever arm, preventing the bracket 15cc' from slipping-off the distal end of the proximal lever. Accordingly, the length of the total lever arm 15b is adjustable axially along opposite directions of arrowed line 27. This embodiment also shows a reflector 42b mounted on the proximal lever arm. Such reflector may be mounted at other locations such as on the distal lever arm and/or on both lever arms and/or on the housing structure, and may be used similarly on any other embodiment of this invention.

FIG. 4A is a diagrammatic in-part cross-sectional view as taken along line 4A—4A of FIG. 4, illustrating the relationship previously described-above relative to the lever arms 15aa and 15a'a' and opposing brackets 15cc and 15cc', and the abutment structure 15a'''.

Figure 4B:
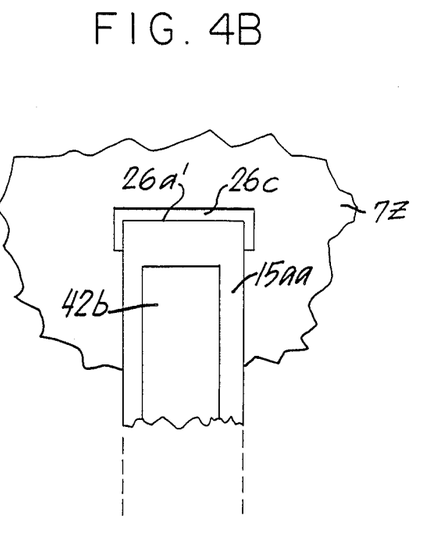
FIG. 4B diagrammatically illustrates a front view as taken along line 4B—4B of the electrical embodiment of FIG. 4A.

FIG. 4B diagrammatically illustrates an in-part view as taken along line 4B—4B of FIG. 4, better illustrating the hinge structure 26a' as to its width and extending through the elongated (wide) through-space opening 26c described-above. Likewise, this view illustrates typical wide width of the lever arms, showing only the proximal lever arm 15aa.

Figures 5, 5A, 5B:
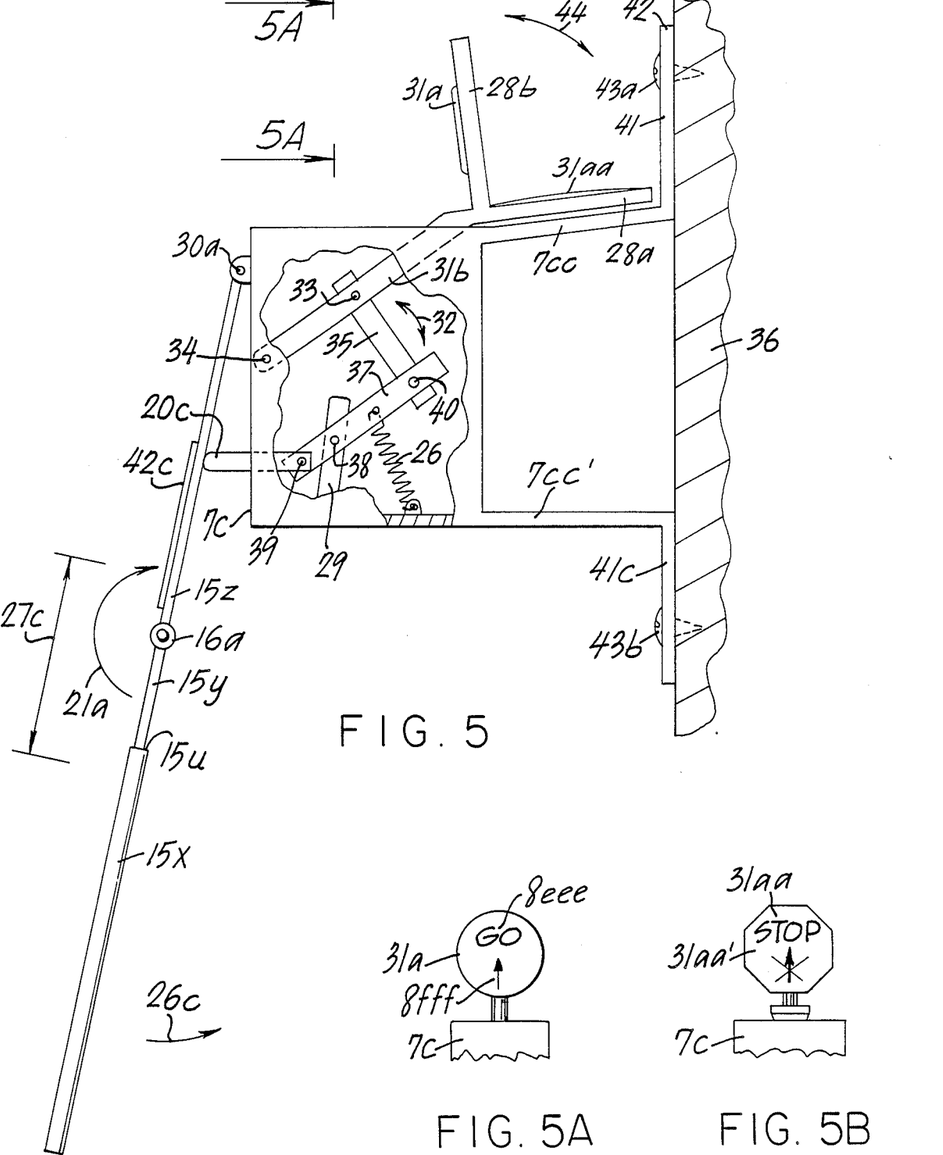
FIG. 5 diagrammatically illustrates a mechanical (non-electrical) embodiment of the invention in side view with partial cut-away.
FIG. 5A diagrammatically illustrates the mechanical embodiment of FIG. 5 as taken along line 5A—5A of FIG. 5, in a front partial view thereof.
FIG. 5B diagrammatically illustrates the mechanical embodiment of FIG. 5 after the bumper has pressed against the lever sufficiently to bring the "stop" sign to an upright position, concurrently bringing the "GO" sign to a horizontal non-viewable position, shown also in a forward partial view thereof.

FIG. 5 illustrates diagrammatically a mechanical alternate embodiment, embodying a very simple lever mechanism having a high degree of stability and reliability, not readily susceptable to breakage and/or becoming inoperative from age or the like. In this illustrated embodiment there is illustrated an equivalent different axially-slidable lever-extension arrangement, here having the distal lever arm including a telescoping distal-end tube mounted on the proximal portion of the distal lever arm for axial telescoping optionally lengthening or shortening the overall length of the total lever arm, by movement in directions along line 27c. Such arrangement may be utilized for any embodiment of this invention. Additionally, the distal lever arm 15y pivots on the hinge 16a positioned on the distal end of the proximal lever arm 15z. Again there is a reflector 42c mounted on the proximal lever arm. The tube 15x includes inner space opening at hole 15 into which the lever arm 15y is mounted and is typically a close friction-fit but slidable therein, such that when slid to a particular position, it remains at that position, relative to the tubular telescoping arm 15x.

In this embodiment of FIG. 5, there is diagrammatically illustrated in a partial cut-away of the housing, the lever-arm arrangement above-noted having the simple mechanism of operation. The lever arm 37 pivots on pin 38 and the proximal end of lever 37 pivots on pin 39 of axially movable button 20c. The distal end of lever 37 pivots on pin 40 in attachment to a proximal end of lever 35 which at its distal end pivots on pin 33 at a mid-section of lever 31b. Lever 31b at its proximal end pivots on pin 34 such that when lever 35 pushes against lever 31b, the sign-structures 28b and 28a move pivotally forwardly from the "GO" position in the view shown in the in-part view of FIG. 5A to the "STOP" position in the view shown in in-part view shown in FIG. 5B. Accordingly, in 5A, the "GO" sign 31a is round and is viewable from a forward position (as a parking automobile would be approaching to park) prior to the automobile bumper striking and pressing against the actuation lever arm 15x or 15y or 15z to thereby press the button 20c. When the button 20 becomes moved axially against the pin 39, the octagonally-shaped "STOP" sign 31aa becomes raised to the "up" position, while the sign 31a of structure 28b becomes moved to a horizontal nonviewable position as shown in FIG. 5B, the "GO" sign typically including the "GO" word 8eee and preferably also the upwardly-pointing arrow 8fff. Likewise, the "STOP" sign 31aaa preferably is of octagonal shape—universally known to mean "stop", and preferably has an X placed over an upwardly-pointing arrow to indicate that forward movement should cease. The housing support structure 7c is mounted by any desired optional mechanism, here typically mounted on mounting arm 7cc and extension 41 thereof by screw 43a and/or by mounting arm 7cc' and extension 41c thereof by screw 43b, onto wall face 42 of wall or equivalent upright structure 36.

Figure 6:
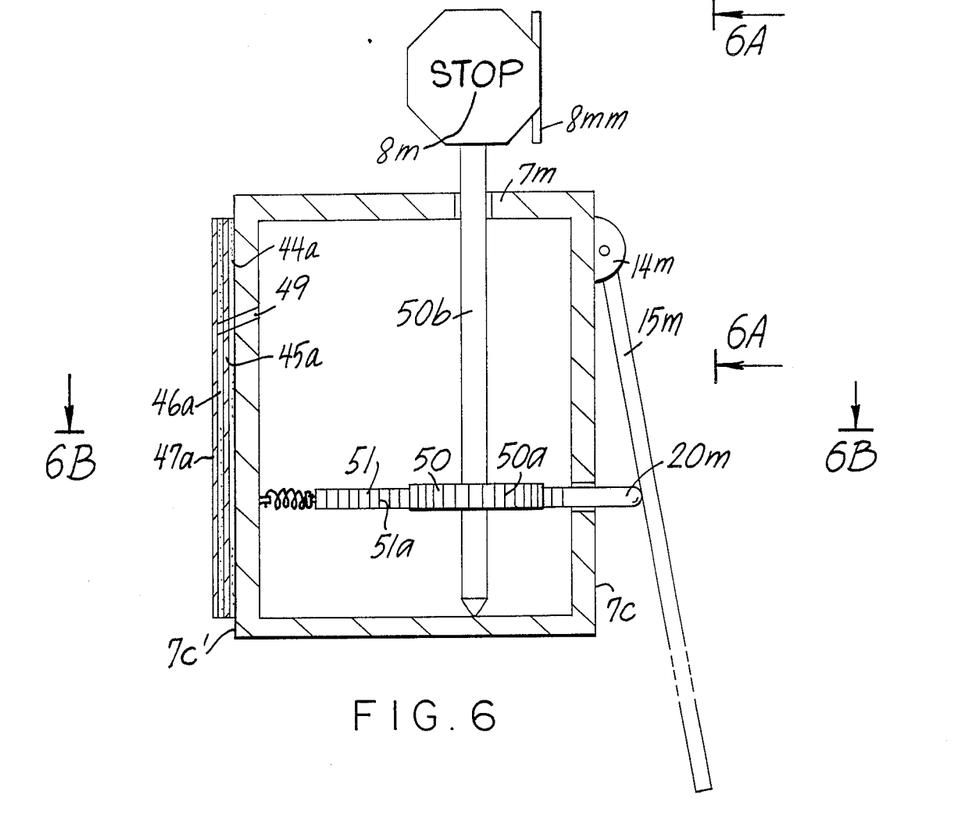
FIG. 6 diagrammatically illustrates an alternate mechanical (non-electrical) embodiment of the invention in side cross-sectional view.

FIG. 6 illustrates diagrammatically a gear and pinion embodiment of particular value again because of the simplicity of lever arrangement and stability thereof against breakage and/or becoming inoperative because of time or the like. In this embodiment, the button 20m again is movable axially when a bumper of an automobile presses against lever 15m or some other equivalent lever such shown in other illustrated embodiments. Along the edges of the elongated extension 51 of button 20m is a toothed surface having teeth 51a that engage teeth 50a of gear 50 that is rigidly mounted on and moves with shaft 50b. Stop sign 8M exhibiting the word "STOP" and preferably of the preferred octagonal shape faces sidewardly, not viewable from a front position, i.e. not visible to a driver of an approaching parking automobile. The sign 8mm (that carries the "GO" sign) faces forwardly in the inactivated state prior to the automobile bumper pressing against lever arm 15m.

Figure 6A:
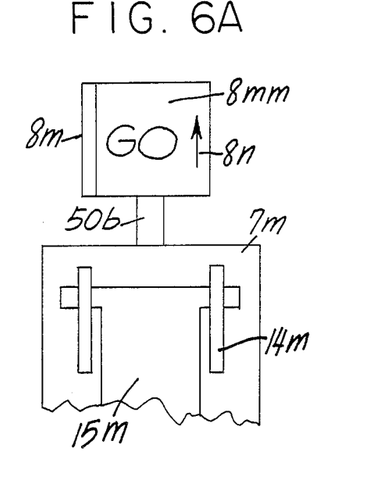
FIG. 6A diagrammatically illustrates an embodiment of the invention as taken along line 6A—6A of FIG. 6, in a front in-part view thereof.

FIG. 6A as a diagrammatic in-part view of the FIG. 6 embodiment as taken along line 6A—6A, is shown in a front view with the structure 8m with the "GO" sign 8mm with its preferred upwardly-directed arrow. Also, the hinge arrangement, and typical broad lever arm 15m is shown. Accordingly, as the automobile bumper presses against the lever arm 15m, the rod 50b rotates to move the "STOP" sign to the front-facing position, until the automobile backs-away whereupon the spring 53 of FIG. 6B returns the GO sign to the forwardly-facing position.

Figure 6B:
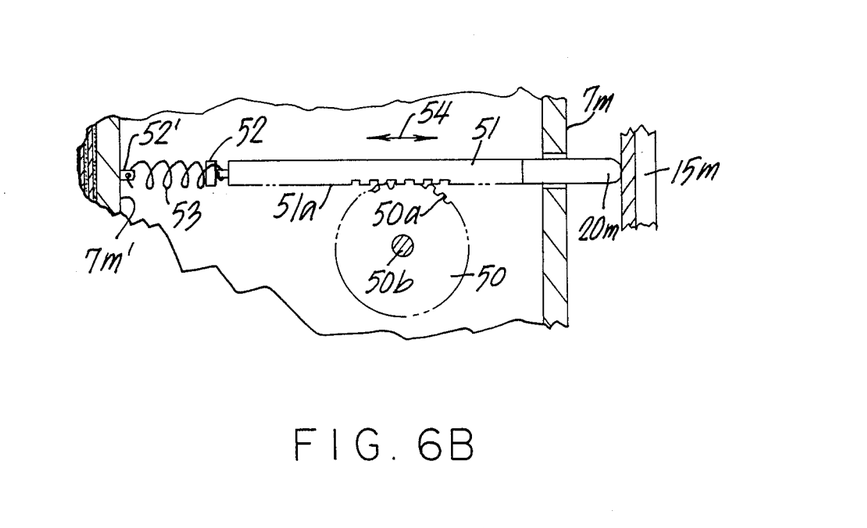
FIG. 6B diagrammatically illustrates a view as taken along line 6B—6B of FIG. 6, in a top cross-sectional view thereof.

FIG. 6B as diagrammatically represented as taken along line 6B—6B, better illustrates the engaging relationship of the teeth 51a of the button extension 51 and the teeth 50a of the gear. Also, the spring 53 mounted on extension key 52 at one end of the spring, and on an appropriate mounting member 52' on the casing-structure 7m', biases the button 20 to the position shown in FIG. 6a when the lever arm 15m not being pressed by an automobile bumper.

Figure 7:
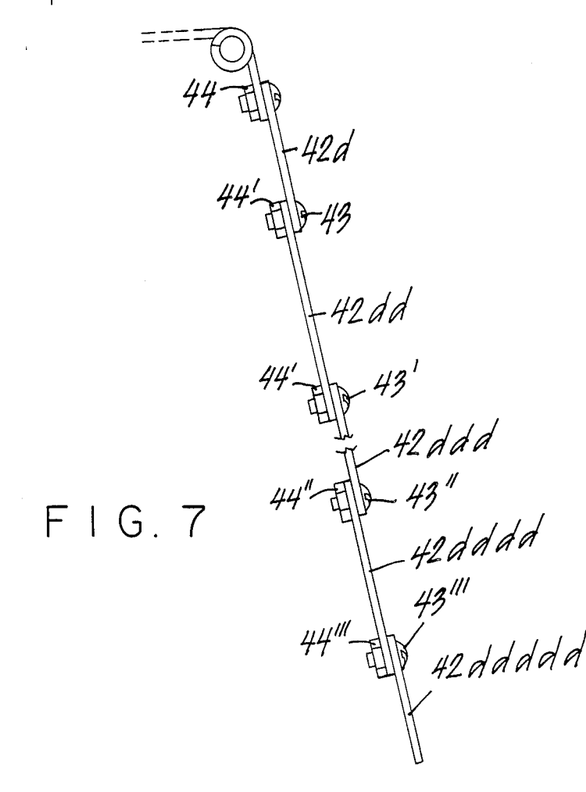
FIG. 7 diagrammatically illustrates in an in-part view of a device otherwise typically identical to that of FIGS. 1 and 2, in which the actuating lever is illustrated as screwed-together extension lengths of actuating lever rigid strips serially arranged substantially coaxially end-to-end, in a side view thereof.

FIG. 7 diagrammatically illustrates an alternate lever-arm arrangement that can be alternatively utilized with any embodiment of this invention, including other embodiments not expressly illustrated, in which additional lever-arm length(s) are merely screw-bolt latched-on to other lever-arm length(s) to extend the total lever-arm to a desired total length. Accordingly there are illustrated the typical several lengths 42d, 42dd, 42ddd, etc. connected by appropriate bolts 43, 43', etc. and nuts 44, 44', etc..

In any of the preceeding illustrated embodiments of this invention, the device is always in a position reliably permitting the driver of the approaching automobile to see and reliably believe a "go" sign with assurance to the driver that the stop-indicator will appear timely when the bumper has advanced to a predetermined safe maximum in pressing against the lever arm.

It is within the scope of this invention to make variation()s and/or modification(s) and/or substitution of equivalent(s) for any one or more of the embodiment(s) of this invention.

I claim:

1. In a motor vehicle garage-parking driver-indicator guide-device for visually signifying at-least prior to engagement of a motor vehicle when it is safe and alternatively after engagement of a motor vehicle whenever it has become not safe for a motor vehicle to move further toward a parking location, including support structure mounting a signaling means for displaying a signal viewable by a driver of a motor vehicle to be advanced forwardly toward the signaling means, and an actuating lever adapted to be actuated, manipulated or moved by an advancing motor vehicle, the improvement comprising said signaling means adapted for mounting in a position where viewable throughout garage parking of a motor vehicle and being in a first position or first state of being such that the signaling means is viewable to the driver as and indicative of existing authorization or approval for continued forwardly-advancing motion by the motor vehicle up to a second predetermined advanced position at which the motor vehicle eventually is actuatable of the activating lever to become moved to or beyond said second predetermined position or an inactivated state of being such that an advance-authorizing signal means no longer exists or is nonviewable, said signaling means being at least one visually-discernible electric light and electrical circuitry therefor providing electrical power thereto and inclusive of a normally-closed switch and switch lever thereof operatively connected to said actuating lever to open said normally-closed switch thereby for deactivating electrification of said visually-diiscernible electric light to an unlighted state whenever said motor vehicle reaches or has reached or has been moved beyond said second predetermined advanced position or said inactivated state, whereby a turning-off of the electric light is indicative to the driver of the motor vehicle that further advancement of the motor vehicle should be terminated, and a spring means connected between said support structure and at-least one of said switch lever and said actuating lever such that said switch lever is biased to a normally closed position whenever said actuating lever has not been physically moved to or past said second predetermined advanced position or said inactivated state, and lever adjustment means for intermittently adjusting the position or angle or orientation of the actuating lever forwardly or rearwardly relative to and substantially along an imaginary line of advancement of a motor vehicle potentially intended to contact and move or actuate said actuating lever.

2. In the motor vehicle driver-indicator guide-device of claim 1 the improvement further including said actuating lever comprising a plurality of consecutively serially interconnected elongated members inclusive of at-least first and second elongated members each respectively having opposite proximal and distal ends, said first elongated member's proximal end being pivotally mounted on said support structure, said second elongated member being adjustably mounted on said first elongated member such that said second elongated member may be intermittently shifted alternately to and from a non-extended state to an extended state relative to the first elongated member and the support structure.

3. In a motor vehicle garage-parking driver-indicator guide-device for visually signifying at-least prior to engagement of a motor vehicle when it is safe and alternately after engagement of a motor vehicle whenever it has become not safe for a motor vehicle to move further toward a parking location, including support structure mounting a signaling means for displaying a signal viewable by a driver of a motor vehicle to be advanced forwardly toward the signaling means, and an actuating lever adapted to be actuated, manipulated or moved by an advancing motor vehicle, the improvement comprising said signaling means being in a first position or first state of being such that the signaling means is viewable to the driver as and indicative of existing authorization or approval for continued forwardly-advancing motion by the motor vehicle up to a second predetermined advanced position at which the motor vehicle eventually is actuatable of the activating lever to become moved to or beyond said second predetermined position or an inactivated state of being such that an advance-authorizing signal means no longer exists or is nonviewable, said actuating lever comprising a plurality of consecutively serially interconnected elongated members inclusive of at-least first and second elongated members each respectively having opposite proximal and distal ends, said first elongated member's proximal end being pivotally mounted on said support structure, said second elongated member being adjustably mounted on said first elongated member such that said second elongated member may be intermittently shifted alternately to and from a non-extended state to an extended state relative to the first elongated member and the support structure, each of said first and second elongated members each having a longitudinal axis, said second elongated member's proximal end being pivotally hinge-mounted on said first elongated member's distal end, such that said second elongated member is intermittently foldable alternately upwardly toward and in juxtaposition to said first elongated member, and downwardly to an extended position at which the longitudinal axis of each of the first and second elongated members are in substantial coaxial alignment with each other, whereby the driver of the motor vehicle is aware that further advancement of the motor vehicle should be terminated.

4. In the motor vehicle driver-indicator guide-device of claim 2, the improvement further including said second elongated member being telescopically mounted on said first elongated member such that said second elongated member is intermittently alternately extendable between an extend position and state and a retracted position and state relative to said first elongated member.

5. In a motor vehicle garage-parking driver-indicator guide-device for visually signifying at-least prior to engagement of a motor vehicle when it is safe and alternately after engagement of a motor vehicle whenever it has become not safe for a motor vehicle to move further toward a parking location, including support structure mounting a signaling means for displaying a signal viewable by a driver of a motor vehicle to be advanced forwardly toward the signaling means, and an actuating lever adapted to be actuated, manipulated or moved by an advancing motor vehicle, the improvement comprising said signaling means adapted for mounting in a position where viewable throughout garage parking of a motor vehicle and being in a first position or first state of being such that the signaling means is viewable to the driver as and indicative of existing authorization or approval for continued forwardly-advancing motion by the motor vehicle up to a second predetermined advanced position at which the motor vehicle eventually is actuatable of the activating lever to become moved to or beyond said second predetermined position or an inactivated state of being such that an advance-authorizing signal means no longer exists or is nonviewable, said signaling means being at least one visually-discernible electric light and electrical circuitry therefor providing electrical power thereto and inclusive of a normally-closed switch and switch lever thereof operatively connected to said actuating lever to open said normally-closed switch thereby for deactivating electrification of said visually-diiscernible electric light to an unlighted state whenever said motor vehicle reaches or has reached or has been moved beyond said second predetermined advanced position or said inactivated state, whereby a turning-off of the electric light is indicative to the driver of the motor vehicle that further advancement of the motor vehicle should be terminated, said actuation lever comprising a plurality of consecutively serially interconnected elongated members inclusive of at-least first and second elongated members, and reflector means mounted on at-least said first elongated member, positioned for being viewable to a driver of a motor vehicle advancing toward the actuating lever, such that said reflector may serve as a steering guide for advancing movement of an advancing motor vehicle.

6. In the motor vehicle driver-indicator guide-device of claim 5, the improvement including said reflector means comprising adhesive-backed reflector tape.

7. In a motor vehicle garage-parking driver-indicator guide-device for visually signifying at-least prior to engagement of a motor vehicle when it is safe and alternatively after engagement of a motor vehicle whenever it has become not safe for a motor vehicle to move further toward a parking location, including support structure mounting a signaling means for displaying a signal viewable by a driver of a motor vehicle to be advanced forwardly toward the signaling means, and an actuating lever adapted to be actuated, manipulated or moved by an advancing motor vehicle, the improvement comprising said signaling means adapted for mounting in a position where viewable throughout garage parking of a motor vehicle and being in a first position or first state of being such that the signaling means is viewable to the driver as and indicative of existing authorization or approval for continued forwardly-advancing motion by the motor vehicle up to a second predetermined advanced position at which the motor vehicle eventually is actuatable of the activating lever to become moved to or beyond said second predetermined position or an inactivated state of being such that an advance-authorizing signal means no longer exists or is nonviewable, said signaling means being at least one visually-discernible electric light and electrical circuitry therefor providing electrical power thereto and inclusive of a normally-closed switch and switch lever thereof operatively connected to said actuating lever to open said normally-closed switch thereby for deactivating electrification of said visually-diiscernible electric light to an unlighted state whenever said motor vehicle reaches or has reached or has been moved beyond said second predetermined advanced position or said inactivated state, whereby a turning-off of the electric light is indicative to the driver of the motor vehicle that further advancement of the motor vehicle should be terminated, and an adhesive composition mounted on an outer surface of said support structure positioned such that said support structure is adherably mountable on a surface of an upright structure.

8. In the motor vehicle driver-indicator guide-device of claim 7, in which including a tape affixed to said support structure, said tape having said adhesive composition as adhesive of an adhesive backing thereto.

* * * * *